(12) United States Patent
Yoda

(10) Patent No.: US 8,376,074 B2
(45) Date of Patent: Feb. 19, 2013

(54) VEHICLE

(75) Inventor: Takehito Yoda, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 593 days.

(21) Appl. No.: 12/524,979

(22) PCT Filed: Feb. 6, 2008

(86) PCT No.: PCT/JP2008/052386
§ 371 (c)(1),
(2), (4) Date: Jul. 29, 2009

(87) PCT Pub. No.: WO2008/096898
PCT Pub. Date: Aug. 14, 2008

(65) Prior Publication Data
US 2010/0001553 A1 Jan. 7, 2010

(30) Foreign Application Priority Data
Feb. 7, 2007 (JP) ................. 2007-028082

(51) Int. Cl.
*B60K 1/04* (2006.01)
(52) U.S. Cl. .................... 180/68.5; 180/65.31
(58) Field of Classification Search .......... 180/65.31, 180/65.1, 68.5
See application file for complete search history.

(56) References Cited

U.S. PATENT DOCUMENTS

| | | | |
|---|---|---|---|
| 5,584,525 A | 12/1996 | Nakano et al. | |
| 5,704,644 A * | 1/1998 | Jaggi | 280/796 |
| 6,264,260 B1 * | 7/2001 | Kronner et al. | 296/37.15 |
| 6,662,891 B2 * | 12/2003 | Misu et al. | 180/68.1 |
| 6,811,197 B1 * | 11/2004 | Grabowski et al. | 296/37.8 |
| 6,902,020 B2 * | 6/2005 | Kronner et al. | 180/68.5 |
| 6,978,855 B2 * | 12/2005 | Kubota et al. | 429/442 |
| 7,048,321 B2 * | 5/2006 | Bandoh et al. | 296/37.8 |
| 7,240,752 B2 * | 7/2007 | Takahashi et al. | 180/68.1 |
| 7,270,202 B2 * | 9/2007 | Kondo | 180/65.1 |
| 7,353,900 B2 * | 4/2008 | Abe et al. | 180/68.5 |
| 7,424,926 B2 * | 9/2008 | Tsuchiya | 180/68.5 |

(Continued)

FOREIGN PATENT DOCUMENTS

| | | |
|---|---|---|
| JP | 2000-238541 A | 9/2000 |
| JP | 2003-327155 A | 11/2003 |

(Continued)

OTHER PUBLICATIONS

Japanese Office Action for corresponding Japanese Patent Application No. 2007-028082 English Language dated Feb. 22, 2011.

(Continued)

*Primary Examiner* — Jeffrey J Restifo
(74) *Attorney, Agent, or Firm* — Sughrue Mion, PLLC

(57) ABSTRACT

A vehicle includes a floor panel, a driver's seat and a passenger's seat fixed to the floor panel and arranged side by side in a direction perpendicular to a traveling direction, and an electric power storage apparatus provided between the driver's seat and the passenger's seat. The vehicle includes a reinforcing member for fixing a supporting frame of the driver's seat and a supporting frame of the passenger's seat to each other. The reinforcing member is formed to extend over the electric power storage apparatus so as to bridge between the driver's seat and the passenger's seat.

3 Claims, 7 Drawing Sheets

U.S. PATENT DOCUMENTS

| | | | |
|---|---|---|---|
| 7,556,110 B2 * | 7/2009 | Yamamoto et al. | 180/65.31 |
| 7,631,712 B2 * | 12/2009 | Watanabe | 180/68.5 |
| 7,654,351 B2 * | 2/2010 | Koike et al. | 180/68.5 |
| 7,810,596 B2 * | 10/2010 | Tsuchiya | 180/68.5 |
| 7,819,215 B2 * | 10/2010 | Tsuchiya | 180/68.5 |
| 7,900,728 B2 * | 3/2011 | Suzuki et al. | 180/68.5 |
| 7,913,787 B2 * | 3/2011 | Watanabe et al. | 180/68.5 |
| 8,016,062 B2 * | 9/2011 | Jufuku | 180/65.31 |
| 8,042,637 B2 * | 10/2011 | Nagata et al. | 180/68.5 |
| 8,051,934 B2 * | 11/2011 | Kiya et al. | 180/68.5 |
| 2004/0016580 A1 * | 1/2004 | Kronner et al. | 180/68.5 |
| 2004/0232672 A1 * | 11/2004 | Bandoh et al. | 280/735 |
| 2007/0026305 A1 | 2/2007 | Jeon et al. | |
| 2009/0183935 A1 * | 7/2009 | Tsuchiya | 180/68.1 |

FOREIGN PATENT DOCUMENTS

| | | | |
|---|---|---|---|
| JP | 2004-090693 A | 3/2004 |
| JP | 2004-345447 A | 12/2004 |
| JP | 2004-345449 A | 12/2004 |
| JP | 2004-345454 A | 12/2004 |
| JP | 2005-001655 A | 1/2005 |
| JP | 2005-116430 A | 4/2005 |
| JP | 2005-268004 A | 9/2005 |
| JP | 2006-236826 A | 9/2006 |
| JP | 2006-278201 A | 10/2006 |
| JP | 2007-015588 A | 1/2007 |
| JP | 2007-015590 A | 1/2007 |
| JP | 2007-015591 A | 1/2007 |
| JP | 2008-123846 A | 5/2008 |

OTHER PUBLICATIONS

Office Action issued in copending Chinese application No. 20088004487.3 dated Apr. 6, 2012.

* cited by examiner

VEHICLE

TECHNICAL FIELD

The present invention relates to a vehicle, in particular, to a vehicle including an electric power storage apparatus.

BACKGROUND ART

In recent years, a hybrid vehicle and an electric vehicle have been put into practical use. In the hybrid vehicle, a motor serving as a driving source and another driving source (for example, internal combustion engine, fuel cell, or the like) are combined, whereas the electric vehicle employs a motor as a driving source. In such vehicles, an electric power storage apparatus is installed to supply the motor with electric power, which is energy. The electric power storage apparatus includes an electric power storage device for storing electric power. The electric power storage device provided therein is, for example, a secondary battery, a capacitor, or the like, which can be charged and discharged repeatedly.

As the secondary battery, a nickel-cadmium battery, a nickel-hydrogen battery, a lithium-ion battery, or the like is used. The secondary battery is constituted by, for example, stacked battery cells. The secondary battery is contained in a battery case and is installed in a vehicle.

It has been considered to place the electric power storage apparatus in the vehicle's cabin in which an occupant is to be present. Placement of the electric power storage apparatus within the cabin advantageously achieves, for example, widening of a trunk room, in which the electric power storage apparatus had been placed traditionally.

Japanese Patent Laying-Open No. 2000-238541 discloses a vehicular battery mounted structure in which a battery, provided on a floor panel to extend in the width direction of the vehicle, is fixed at its outer ends to center pillars located in the lateral side portions of the vehicle. It is disclosed that, in this structure, the battery reinforces a strengthening member to achieve improved rigidity of the vehicular body against lateral impact without an extra cross member.

Japanese Patent Laying-Open No. 2005-001655 discloses a structure in which a high voltage electrical component case containing a battery, which is a heavy load, is provided on the floor of a vehicular body between a driver's seat and a passenger's seat arranged side by side in the width direction of the vehicle.

If an electric power storage apparatus including an electric power storage device is placed within a cabin, the electric power storage apparatus may be positioned between seats. For example, in Japanese Patent Laying-Open No. 2005-001655 mentioned above, the battery is placed between the driver's seat and the passenger's seat.

When lateral impact is imposed on such a vehicle having an electric power storage apparatus arranged between seats, the impact may be transferred via a seat, resulting in great impact on the electric power storage apparatus.

DISCLOSURE OF THE INVENTION

It is an object of the present invention to provide a vehicle capable of restraining impact on an electric power storage apparatus when lateral impact is imposed.

A vehicle in a first aspect of the present invention includes a floor member. The vehicle includes a first seat and a second seat fixed to the floor member and arranged side by side in a direction perpendicular to a traveling direction. The vehicle includes an electric power storage apparatus provided between the first seat and the second seat. The vehicle includes a reinforcing member for fixing a first framework member of the first seat and a second framework member of the second seat to each other. The reinforcing member is formed to extend over the electric power storage apparatus so as to bridge between the first seat and the second seat.

In the invention, it is preferable that the first framework member have a first supporting frame fixed to the floor member. The second framework member has a second supporting frame fixed to the floor member. The reinforcing member is fixed to the first supporting frame and the second supporting frame.

In the invention, it is preferable that the vehicle include a plurality of the reinforcing members. Each of the reinforcing members is formed to have a bar-like shape. The reinforcing members are arranged to separate from each other.

In the invention, it is preferable that the vehicle include a container box provided on top of the electric power storage apparatus. The reinforcing member includes an assisting member provided in the container box.

A vehicle in a second aspect of the present invention includes a floor member. The vehicle includes a first seat and a second seat fixed to the floor member and arranged side by side in a direction perpendicular to a traveling direction. The vehicle includes an electric power storage apparatus provided between the first seat and the second seat. The vehicle includes a fall prevention member provided on top of the electric power storage apparatus. The fall prevention member has a strength to receive one of the first seat and the second seat when the one falls onto the fall prevention member, so as to prevent the one from hitting against the electric power storage apparatus.

In the invention, it is preferable that the fall prevention member include an outer case having a box-like shape. The fall prevention member includes a strengthening plate provided within the outer case. The strengthening plate is formed to have a surface extending in the direction perpendicular to the traveling direction. The strengthening plate has a wave-like cross section when taken along a plane that is along the traveling direction.

A vehicle in a third aspect of the present invention includes a floor member. The vehicle includes a first seat and a second seat fixed to the floor member and arranged side by side in a direction perpendicular to a traveling direction. The vehicle includes an electric power storage apparatus provided between the first seat and the second seat. The vehicle includes a fastening member for fixing the electric power storage apparatus to the floor member. The electric power storage apparatus has an insertion through hole into which the fastening member is inserted. The insertion through hole has a longitudinal direction in the direction perpendicular to the traveling direction. The insertion through hole has a space portion with a narrowed width.

In the invention, it is preferable that the insertion through hole has a plurality of the space portions in the longitudinal direction.

A vehicle in a fourth aspect of the present invention includes a floor member. The vehicle includes a first seat and a second seat fixed to the floor member and arranged side by side in a direction perpendicular to a traveling direction. The vehicle includes an electric power storage apparatus arranged between the first seat and the second seat. The floor member has a recess portion formed between the first seat and the second seat. The electric power storage apparatus is provided in the recess portion.

In the invention, it is preferable that the recess portion be formed to be deeper than a height of the electric power storage apparatus.

A vehicle according to a fifth aspect of the present invention includes a floor member. The vehicle includes an interior part provided within a cabin. The vehicle includes a first seat and a second seat fixed to the floor member and arranged side by side in a direction perpendicular to a traveling direction. The vehicle includes an electric power storage apparatus provided between the first seat and the second seat. The vehicle includes a reinforcing member fixed to at least one of the first seat and the second seat. The reinforcing member is fixed to the interior part, which is different from the electric power storage apparatus, to prevent the one from falling onto the other.

In the invention, it is preferable that the vehicle include a container box provided on top of the electric power storage apparatus. The interior part includes the container box.

Note that two or more of the configurations described above may be combined appropriately.

According to the present invention, there can be provided a vehicle capable of restraining impact on an electric power storage apparatus when lateral impact is imposed.

BEST MODES FOR CARRYING OUT THE INVENTION

First Embodiment

Figure 1:
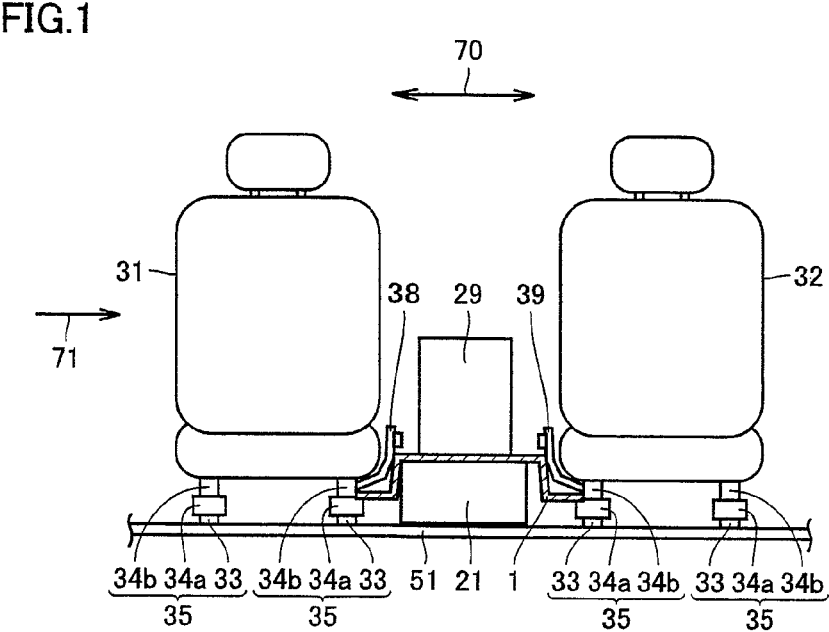
FIG. 1 is a schematic cross sectional view of a vehicle in a first embodiment.
Figure 2:
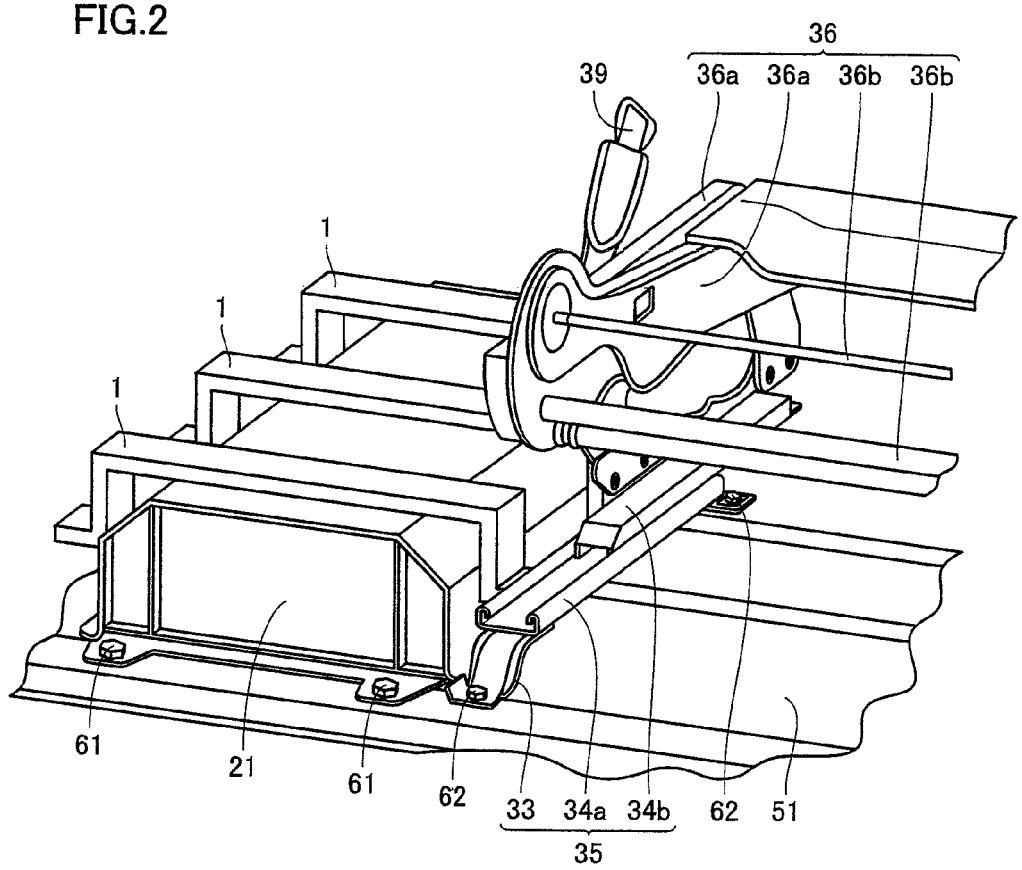
FIG. 2 is an enlarged schematic perspective view of an electric power storage apparatus and a framework member of a passenger's seat of the vehicle in the first embodiment.
Figure 3:
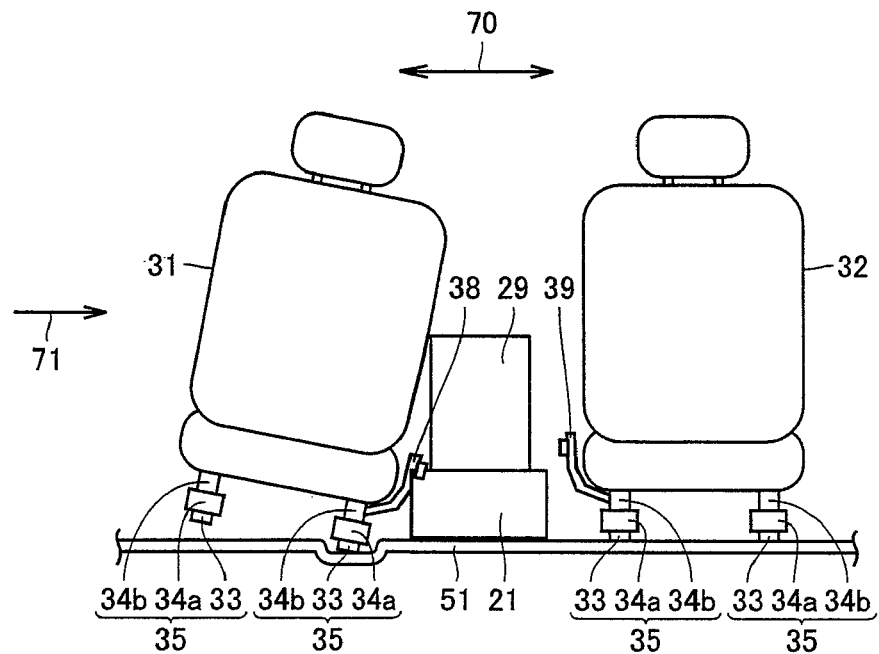
FIG. 3 is a schematic cross sectional view of a vehicle of a comparative example for the first embodiment.

Referring to FIG. 1 to FIG. 3, a vehicle in a first embodiment will be described. The vehicle in the present embodiment is a hybrid vehicle employing as motive power sources an internal combustion engine such as a gasoline engine and a motor driven by a chargeable and dischargeable secondary battery.

FIG. 1 shows a schematic cross sectional view of the vehicle in the present embodiment. FIG. 1 is a schematic cross sectional view when taken at a portion in front of the driver's seat and the passenger's seat in the width direction of the vehicular body. FIG. 1 is a schematic cross sectional view when viewed from the front side to the back side in the vehicular body.

The vehicle in the present embodiment includes a floor panel 51 serving as a floor member. Floor panel 51 is formed to have a plate-like shape. Floor panel 51 constitutes a floor of a cabin in which an occupant is to be present.

The vehicle in the present embodiment includes driver's seat 31 serving as a first seat. The vehicle includes passenger's seat 32 serving as a second seat. A direction indicated by an arrow 70 is the width direction of the vehicular body and is perpendicular to the traveling direction. Driver's seat 31 and passenger's seat 32 are arranged side by side in the direction perpendicular to a direction in which the vehicle travels. Driver's seat 31 and passenger's seat 32 are arranged side by side in the width direction indicated by arrow 70. Driver's seat 31 and passenger's seat 32 are fixed to floor panel 51.

The vehicle in the present embodiment includes an electric power storage apparatus 21. Electric power storage apparatus 21 includes a power storage case and an electric power storage device provided within the power storage case. The electric power storage device in the present embodiment is a secondary battery. Electric power storage apparatus 21 is positioned between driver's seat 31 and passenger's seat 32. Electric power storage apparatus 21 is fixed to floor panel 51. In the present embodiment, electric power storage apparatus 21 is provided on top of floor panel 51.

Driver's seat 31 includes a receiving metal fitting (buckle) 38 for receiving a plate-like inserting metal fitting (tongue plate) engaged with a belt portion of a seatbelt. Receiving metal fitting 38 is formed to receive the inserting metal fitting therein, thereby fixing the inserting metal fitting thereto. Of the lateral sides of driver's seat 31, receiving metal fitting 38 is positioned at a lateral side facing passenger's seat 32.

Passenger's seat 32 includes a receiving metal fitting 39 to which an inserting metal fitting of a seatbelt is inserted. Of the lateral sides of passenger's seat 32, receiving metal fitting 39 is positioned at a side facing driver's seat 31. Each of receiving metal fittings 38, 39 is formed to extend upward. Each of receiving metal fittings 38, 39 is positioned to face electric power storage apparatus 21.

FIG. 2 shows a schematic perspective view of framework member of a seat of the vehicle in the present embodiment and the electric power storage apparatus. FIG. 2 is an enlarged schematic perspective view of the framework member of the passenger's seat and the electric power storage apparatus.

Driver's seat 31 serving as the first seat has a first framework member. Passenger's seat 32 serving as the second seat has a second framework member. The first and second framework members constitute the frameworks of the seats respectively. The first framework member or the second framework member is provided within a base portion and a backrest portion of driver's seat 31 or passenger's seat 32. The first and second framework members have the same structure. Each of the framework members is formed of, for example, a metal.

Referring to FIG. 2, the second framework member includes a seat frame 36. Seat frame 36 has a plate 36a. Plate 36a is formed to have a plate-like shape. Plate 36a has a surface extending in the front-back direction of the vehicle. The surface of plate 36a extends in the vertical direction. Seat frame 36 has a rod 36b formed to extend perpendicularly from the surface of plate 36a. Rod 36b is formed to have a bar-like shape. Rod 36b is formed to extend in the width direction of the vehicular body.

The second framework member in the present embodiment includes a supporting frame 35. Supporting frame 35 includes a leg 33. Leg 33 is fixed to floor panel 51 by a bolt 62 serving as a fastening member. In this way, the second framework member is fixed to floor panel 51. Receiving metal fitting 39 is fixed to the second framework member. Receiving metal fitting 39 is fixed to supporting frame 35.

Supporting frame 35 has a slide rail 34a. Slide rail 34a has a U-shaped cross section. Slide rail 34a is formed to extend in the front-back direction of the vehicular body. Supporting frame 35 has a slide portion 34b. Slide portion 34b formed herein is engaged with slide rail 34a.

Slide portion 34b is formed to extend in the front-back direction of the vehicular body. Slide portion 34b is movable along slide rail 34a in the front-back direction. Seat frame 36 is fixed to slide portion 34b. Seat frame 36 is formed to be movable in the front-back direction integrally with slide portion 34b.

Electric power storage apparatus 21 is provided in a side lateral to supporting frame 35. Electric power storage apparatus 21 is fixed to floor panel 51 by a bolt 61 serving as a fastening member. When seen in a planar view, electric power storage apparatus 21 in the present embodiment has a longitudinal direction, and is positioned so that the longitudinal direction extends in the front-back direction of the vehicular body.

The vehicle in the present embodiment includes a reinforcing member 1 for connecting and fixing the first framework member of driver's seat 31 and the second framework member of passenger's seat 32 to each other. Reinforcing member 1 in the present embodiment is formed to bridge between driver's seat 31 and passenger's seat 32. Reinforcing member 1 is positioned to extend over electric power storage apparatus 21. Reinforcing member 1 is fixed to supporting frame 35 of driver's seat 31 and supporting frame 35 of passenger's seat 32. Reinforcing member 1 in the present embodiment is fixed to slide rail 34a of each seat.

Referring to FIG. 1 and FIG. 2, reinforcing member 1 in the present embodiment is formed to have a bar-like shape. When viewed from the front side, reinforcing member 1 is U-shaped. In the present embodiment, a plurality of reinforcing members 1 are used to bind supporting frame 35 of driver's seat 31 and supporting frame 35 of passenger's seat 32 to each other. The plurality of reinforcing members 1 provided herein are separated from one another. The plurality of reinforcing members 1 are positioned to extend substantially in parallel with one another.

Referring to FIG. 1, the vehicle in the present embodiment includes a console 29 serving as a container box. Console 29 formed herein is box-like. Console 29 in the present embodiment is provided on top of electric power storage apparatus 21. Console 29 has an open/close cover on its upper surface. With the open/close cover of console 29 opened, a small article or the like may be contained therein.

FIG. 3 shows a schematic cross sectional view of a vehicle serving as a comparative example for the present embodiment. FIG. 3 is a schematic cross sectional view when taken at a portion in front of the driver's seat and the passenger's seat, along a plane parallel to the width direction of the vehicular body.

In the vehicle serving as the comparative example, no reinforcing member is provided to fix driver's seat 31 and passenger's seat 32 to each other. Electric power storage apparatus 21 is provided between driver's seat 31 and passenger's seat 32.

In the vehicle of the comparative example, for example, when lateral impact is imposed on the vehicular body as indicated by an arrow 71, driver's seat 31 may be knocked down toward the central portion in the width direction of the vehicular body as indicated by an arrow 72. As driver's seat 31 falls, receiving metal fitting 38 of driver's seat 31 may hit against electric power storage apparatus 21, resulting in great impact on electric power storage apparatus 21.

As such, in the vehicle of the comparative example, upon lateral impact on the vehicular body, a portion of driver's seat 31 may hit against electric power storage apparatus 21 to impose a great impact on electric power storage apparatus 21. Likewise, upon impact from the passenger's seat 32 side, for example, receiving metal fitting 39 of passenger's seat 32 may hit against electric power storage apparatus 21 to impose great impact on electric power storage apparatus 21.

Referring to FIG. 1, in the vehicle in the present embodiment, reinforcing members 1 are provided to fix the first framework member of the first seat and the second framework member of the second seat to each other. This can reduce the lateral impact. For example, when impact is imposed from the driver's seat 31 side as indicated by arrow 71, the impact is transferred to driver's seat 31. The impact is then transferred to passenger's seat 32 via reinforcing members 1. In this way, the lateral impact can be cushioned by the both of driver's seat 31 and passenger's seat 32, and impact as a whole can be reduced. This achieves restraint of transferring of the impact to the electric power storage apparatus.

Further, since the respective framework members of driver's seat 31 and passenger's seat 32 are fixed to each other by reinforcing members 1, driver's seat 31 can be restrained from falling. Accordingly, a portion of driver's seat 31 can be restrained from directly hitting against electric power storage apparatus 21, thus restraining impact on electric power storage apparatus 21. For example, receiving metal fitting 38 of driver's seat 31 can be restrained from hitting against electric power storage apparatus 21.

Also, if no receiving metal fitting is provided in a seat's side facing the center of the vehicular body, the seat's framework member can be restrained from colliding with the electric power storage apparatus, thereby achieving restraint of impact on the electric power storage apparatus. Also when impact is imposed from the passenger's seat side, impact on the electric power storage apparatus can be restrained.

In the present embodiment, the plurality of reinforcing members each have a bar-like shape and are separated from one another. With this configuration, the reinforcing members can be given any strength. Also, the reinforcing members can be strengthened.

In the present embodiment described so far, the electric power storage apparatus is provided between the driver's seat and the passenger's seat but should not necessarily be positioned between seats in the first row of the vehicle. It may be provided between seats in the second or following row. For example, the electric power storage apparatus may be provided between one seat and another seat in the second row.

The reinforcing members in the present embodiment are fixed to the slide rails of the supporting frames but are not limited to this form and may be fixed to anywhere in the respective framework members of the seats. For example, the reinforcing members may be fixed to the legs of the supporting frames.

Each of the reinforcing members in the present embodiment has a bar-like shape but is not limited to this form and can have any shape. For example, the reinforcing members may each have a plate-like shape or may be formed to include a plate-like reinforcing member and a bar-like reinforcing member.

Second Embodiment

Figure 4:
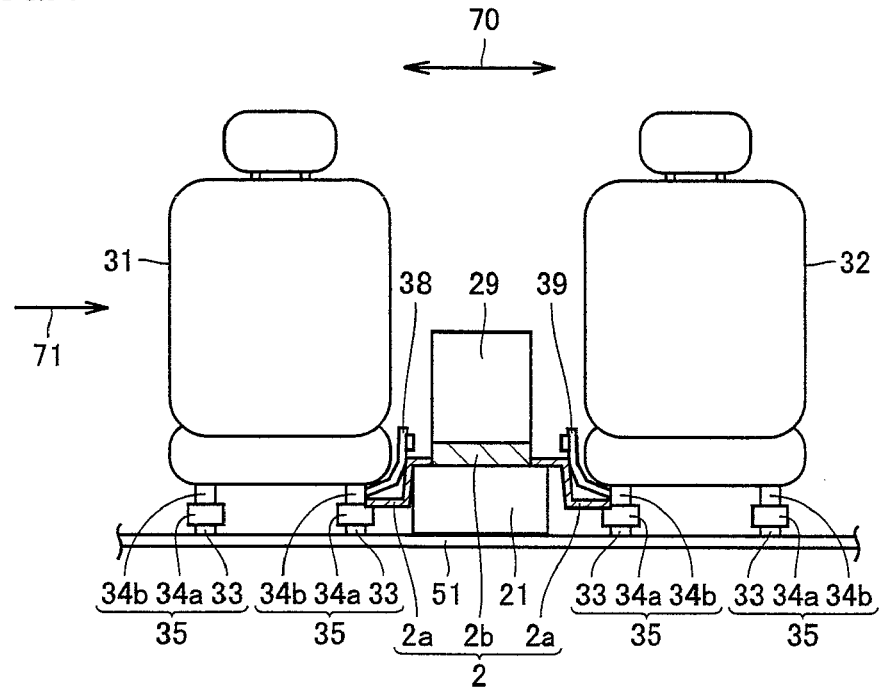
FIG. 4 is a schematic cross sectional view of a vehicle in a second embodiment.

Referring to FIG. 4, a vehicle in a second embodiment will be described. The vehicle in the present embodiment differs from the first embodiment in the configuration of its reinforcing member.

FIG. 4 is a schematic cross sectional view of the vehicle in the present embodiment. FIG. 4 is a schematic cross sectional view when taken at a portion in front of the driver's seat and the passenger's seat in the width direction of the vehicular body. The vehicle in the present embodiment includes a reinforcing member 2. Reinforcing member 2 is positioned to prevent one of driver's seat 31 and passenger's seat 32 from falling toward the other.

Reinforcing member 2 includes fixing portions 2a. Each of fixing portions 2a is formed to have a bar-like shape. Fixing portions 2a are fixed to respective supporting frames 35 of the seats. Fixing portions 2a are fixed to a console 29, which is provided in the cabin and serves as an interior part. Reinforcing member 2 in the present embodiment is fixed to the interior part provided within the cabin.

In the present embodiment, when lateral impact is imposed, reinforcing member 2 thus fixed to console 29 can restrain impact on electric power storage apparatus 21. For example, when impact is imposed from the driver's seat side as indicated by an arrow 71, the impact is transferred to passenger's seat 32 via console 29, thus reducing the impact. Further, driver's seat 31 can be prevented from falling, thereby achieving restraint of impact on electric power storage apparatus 21.

Reinforcing member 2 in the present embodiment has an assisting portion 2b. Assisting portion 2b is provided within console 29 serving as the interior part. Assisting portion 2b in the present embodiment is formed to have a bar-like shape. Assisting portion 2b is positioned to connect fixing portions 2a to each other in one straight line. Assisting portion 2b is positioned between fixing portions 2a disposed opposite in the width direction.

With assisting portion 2b provided within console 29 serving as the interior part, lateral impact transferred to a fixing portion can be transferred via assisting portion 2b to the other fixing portion located on the opposite side, thereby reducing the impact. For example, when impact is imposed from the driver's seat 31 side as indicated by arrow 71, the impact can be transferred to passenger's seat 32 via fixing portions 2a and assisting portion 2b of reinforcing member 2, thereby reducing the impact. In addition, driver's seat 31 can be prevented from falling.

The assisting portion of the reinforcing member in the present embodiment has a bar-like shape but is not limited to this form and may have any shape. The assisting portion may have any shape as long as it is formed to connect the fixing portions and reinforce the interior part.

The reinforcing member in the present embodiment is fixed to the console but is not limited to this form. The reinforcing member may be fixed to any interior part. An interior part herein represents any device provided in the cabin of the vehicle, apart from the electric power storage apparatus. For example, if the shift lever of an automatic transmission is positioned between the driver's seat and the passenger's seat, the reinforcing member may be fixed to the housing of the shift lever. Alternatively, if the electric power storage apparatus is provided between the driver's seat and the passenger's seat, the driver's seat and the passenger's seat may be fixed to a seat of the second row by the reinforcing member.

The reinforcing member in the present embodiment is fixed to the driver's seat serving as a first seat and the passenger's seat serving as a second seat, but is not limited to this form and may be fixed to at least one of the seats.

Further, the reinforcing member in the present embodiment is fixed to the respective supporting frames of the seats but is not limited to this form. The reinforcing member may be fixed to anywhere in the respective framework members of the seats. In addition, the reinforcing member in the present embodiment includes the assisting portion but is not limited to this form. The reinforcing member may include no assisting portion.

Other configurations, functions, and effects are the same as those in the first embodiment, so explanation therefor is not repeated.

Third Embodiment

Figure 5:
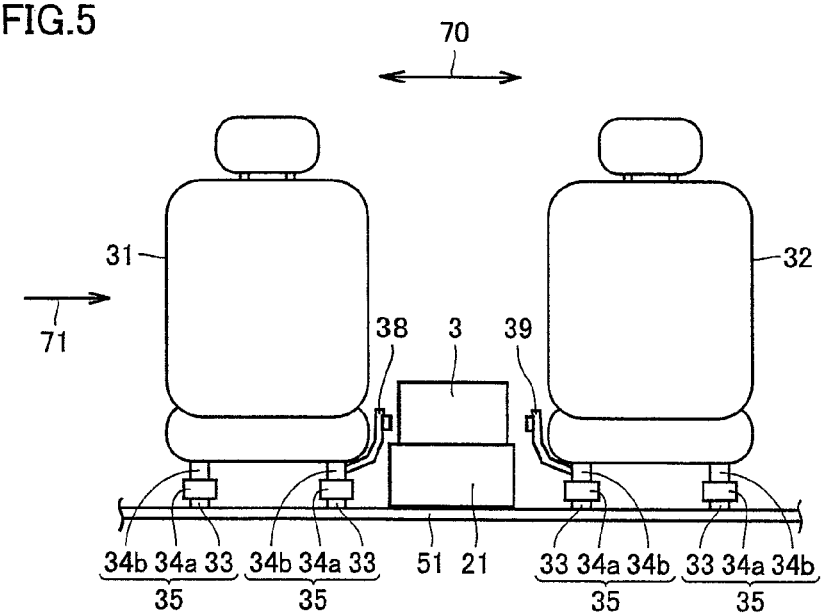
FIG. 5 is a schematic cross sectional view of a vehicle in a third embodiment.
Figure 6:
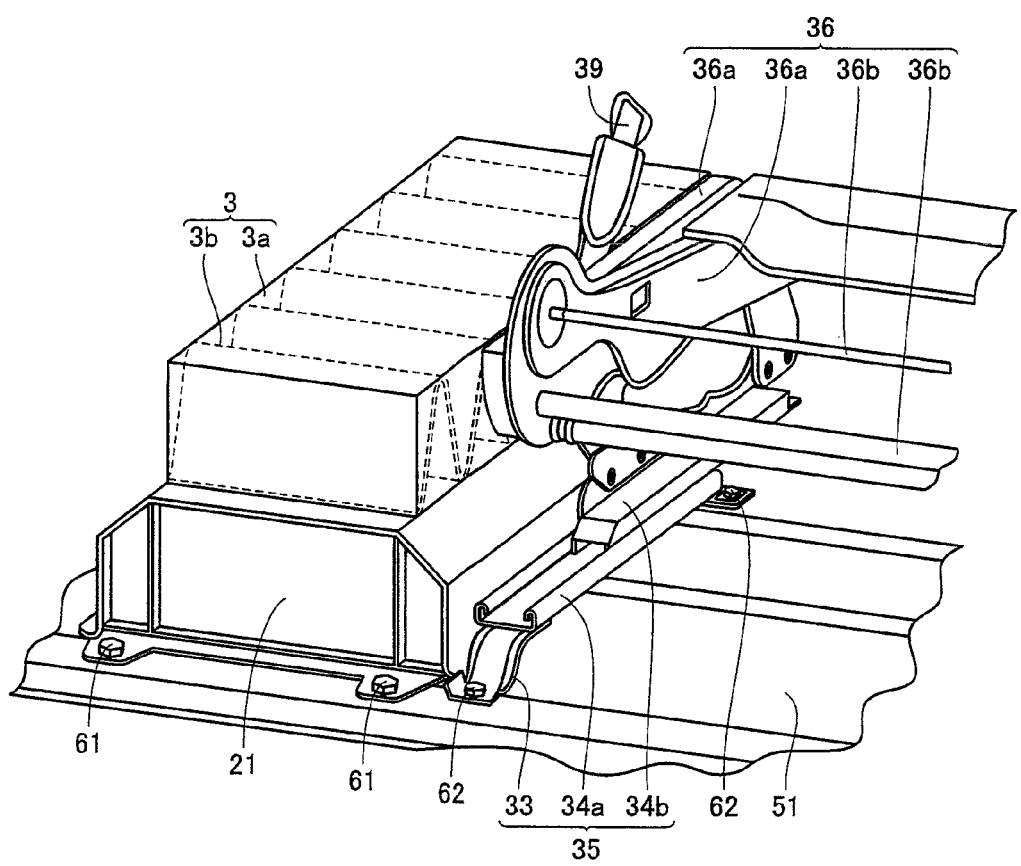
FIG. 6 is an enlarged schematic perspective view of an electric power storage apparatus and a framework member of a passenger's seat in the vehicle in the third embodiment.
Figure 7:
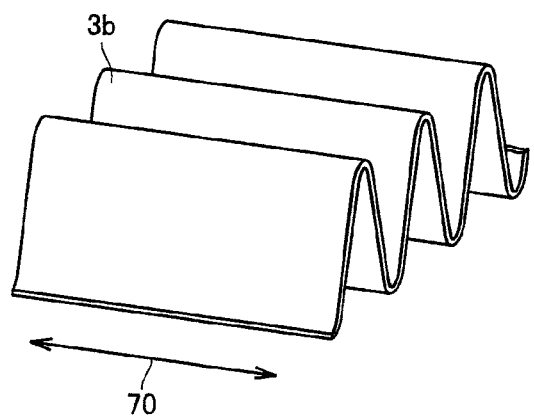
FIG. 7 is a schematic perspective view of a strengthening plate of a fall prevention box in the third embodiment.

Referring to FIG. 5 to FIG. 7, a vehicle in a third embodiment will be described.

FIG. 5 is a schematic cross sectional view of the vehicle in the present embodiment. FIG. 5 is a schematic cross sectional view when taken at a portion in front of the driver's seat and the passenger's seat in the width direction of the vehicular body. The vehicle in the present embodiment includes a fall prevention box 3 serving as a fall prevention member to restrain a seat from falling. Fall prevention box 3 formed herein has a box-like shape. Fall prevention box 3 is provided on top of an electric power storage apparatus 21. Fall prevention box 3 has a strength to receive one of the driver's seat and the passenger's seat when it is knocked down thereonto, thus preventing the seat from falling onto the electric power storage apparatus.

FIG. 6 is an enlarged schematic perspective view of the framework member of the passenger's seat and the electric power storage apparatus of the vehicle in the present embodiment. Fall prevention box 3 in the present embodiment is formed to have a rectangular solid shape. Fall prevention box 3 includes an outer case 3a. Fall prevention box 3 has a strengthening plate 3b serving as a strengthening member. Strengthening plate 3b is provided within outer case 3a.

FIG. 7 is a schematic perspective view of the strengthening plate in the present embodiment. Strengthening plate 3b formed herein has a plate-like shape. An arrow 70 indicates the width direction of the vehicle. Strengthening plate 3b has a cross section with a wave-like shape when taken along a plane that is along a direction in which the vehicle travels. Strengthening plate 3b has a surface extending in the width direction.

Referring to FIG. 5 and FIG. 6, in the vehicle in the present embodiment, for example, when impact is imposed from the driver's seat 31 side as indicated by an arrow 71, a portion of driver's seat 31 hits against the fall prevention member, whereby driver's seat 31 can be prevented from falling. As a result, driver's seat 31 can be prevented from hitting against electric power storage apparatus 21. For example, receiving metal fitting 38 of driver's seat 31 can be prevented from hitting against electric power storage apparatus 21. As a result, impact on electric power storage apparatus 21 can be restrained. Similarly, when impact is imposed from the passenger's seat 32 side, impact on electric power storage apparatus 21 can be restrained.

The fall prevention member in the present embodiment includes the outer case and the strengthening plate provided within the outer case. This configuration allows increased strength of the fall prevention member, thus more effectively preventing a seat from hitting against the electric power storage apparatus.

In the present embodiment, the fall prevention member includes the strengthening plate having the wave-like cross section. With this configuration, the fall prevention member can be kept light-weighted and the strength thereof can be increased.

The fall prevention member is not limited to the box-like shape but may be in any form. For example, a plurality of wall members may be formed to stand on the upper surface of the electric power storage apparatus. Further, the strengthening member provided within the fall prevention member is not limited to the plate-like shape but can have any shape. For example, a plurality of strengthening members each having a bar-like shape may be provided within the outer case.

Other configurations, functions, and effects are the same as those in the first embodiment, so explanation therefor is not repeated.

Fourth Embodiment

Referring to FIG. 8 to FIG. 11, a vehicle in a fourth embodiment will be described.

Figure 8:
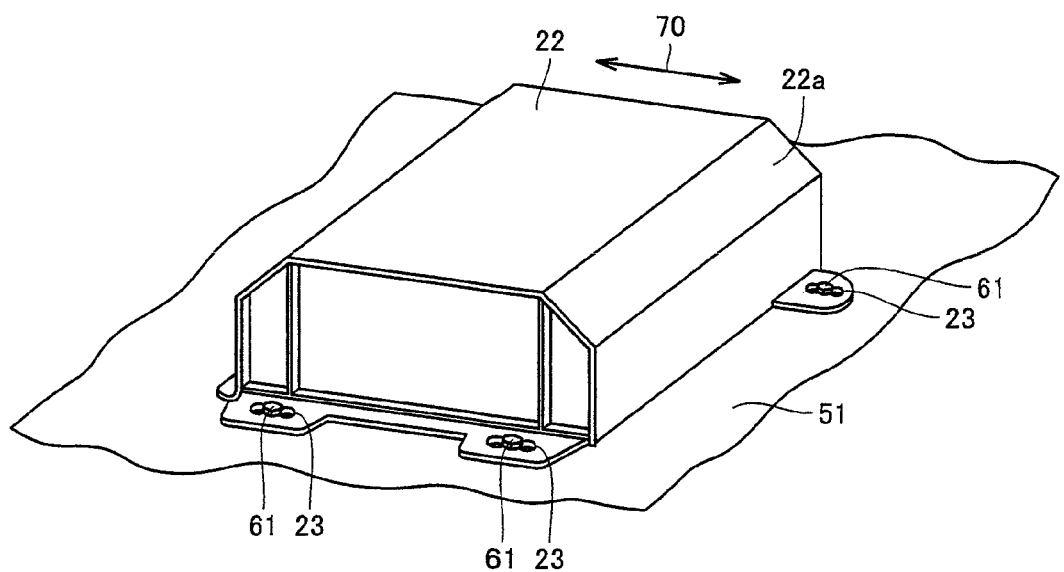
FIG. 8 is a schematic perspective view of an electric power storage apparatus in a fourth embodiment.

FIG. 8 is a schematic perspective view of an electric power storage apparatus in the present embodiment. The electric power storage apparatus in the present embodiment is provided between the driver's seat and the passenger's seat. An arrow 70 indicates the width direction of the vehicular body.

Electric power storage apparatus 22 in the present embodiment is fixed to floor panel 51 by bolts 61 each serving as a fastening member. Electric power storage apparatus 22 has a case 22a serving as a housing. Case 22a is fixed to floor panel 51 by bolts 61.

Figure 9:
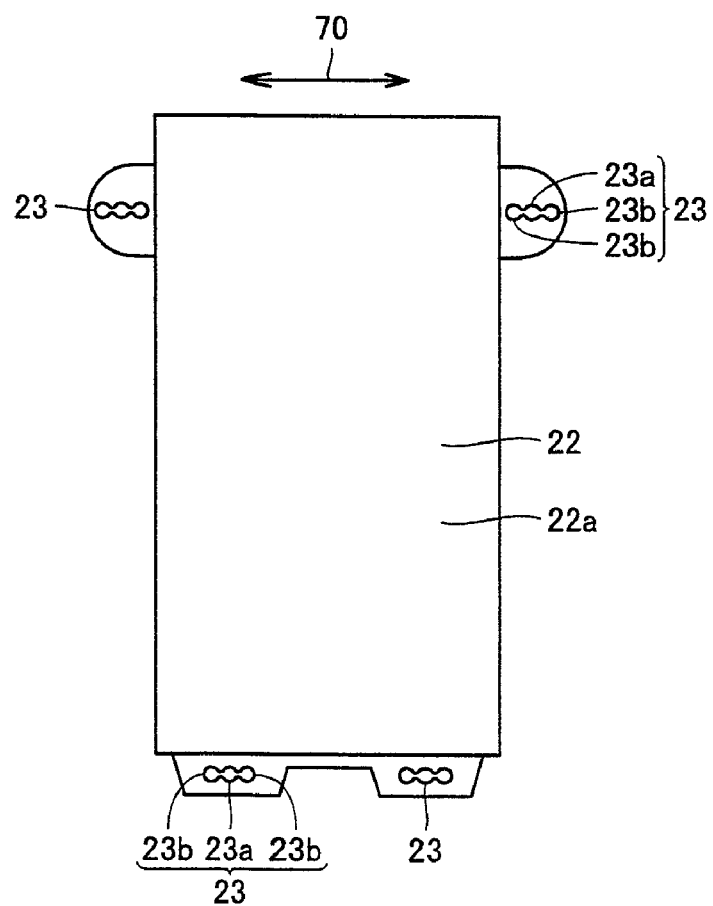
FIG. 9 is a schematic plan view of the electric power storage apparatus in the fourth embodiment.

FIG. 9 shows a schematic plan view of the electric power storage apparatus in the present embodiment. Case 22a has insertion through holes 23 into which bolts 61 are inserted. Insertion through holes 23 in the present embodiment have their longitudinal directions in the width direction. In the present embodiment, they are formed to fix electric power storage apparatus 22 in four locations. Insertion through holes 23 are formed in four locations of electric power storage apparatus 22.

Figure 10:
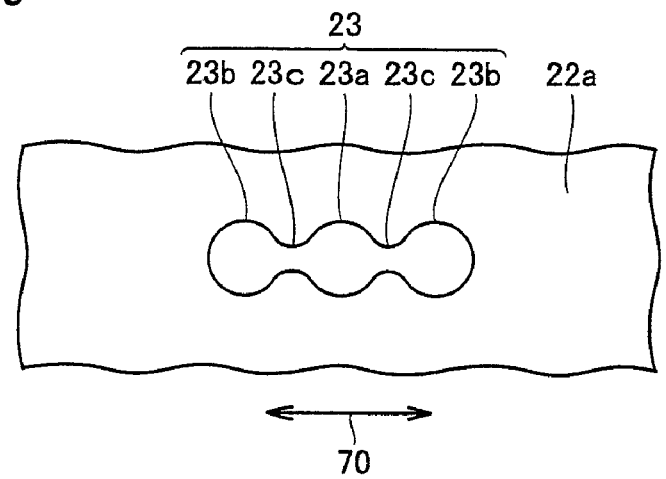
FIG. 10 is an enlarged schematic plan view of an insertion through hole for a bolt in the electric power storage apparatus in the fourth embodiment.

FIG. 10 shows a schematic plan view of an insertion through hole in the present embodiment. Insertion through hole 23 is formed to extend in the width direction of the vehicular body. Insertion through hole 23 has a space portion 23c with a narrowed width. In the present embodiment, two space portions 23c are provided in the longitudinal direction of hole 23. Insertion through hole 23 has a plurality of space portions 23c.

Insertion through hole 23 has a central hole portion 23a located in the substantially central portion in its longitudinal direction. On a side lateral to central hole portion 23a, a side hole portion 23b is formed. In the present embodiment, on the opposite sides lateral to central hole portion 23a, side hole portions 23b are formed. Central hole portion 23a and side hole portions 23b communicate with one another via space portions 23c. Thus, in the present embodiment, the plurality of holes communicate with one another via the space portions.

Referring to FIG. 8 to FIG. 10, when fixing electric power storage apparatus 22 to floor panel 51, a bolt 61 is inserted into central hole portion 23a of insertion through hole 23.

Figure 11:
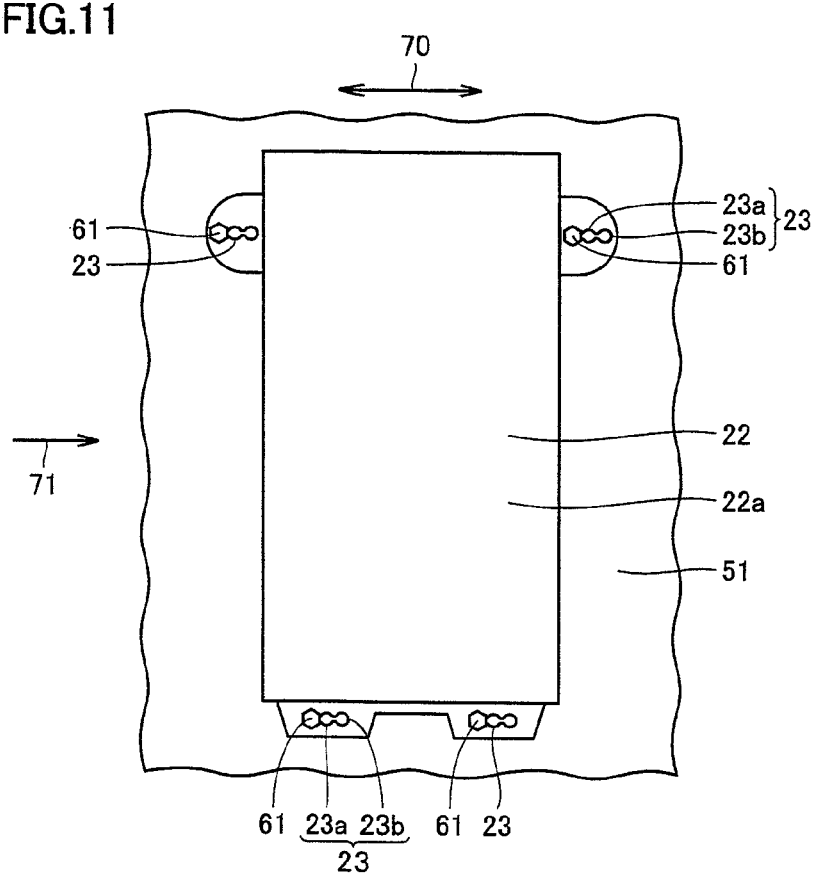
FIG. 11 is another schematic plan view of an electric power storage apparatus in the fourth embodiment.

FIG. 11 shows a schematic plan view of the electric power storage apparatus upon lateral impact. When lateral impact is imposed on the vehicle as indicated by an arrow 71, for example, the driver's seat is knocked down, which exerts force onto electric power storage apparatus 22 in the width direction of the vehicular body. In the present embodiment, the force causes electric power storage apparatus 22 to move in the width direction.

Bolt 61 is moved from central hole portion 23a to a side hole portion 23b. When being moved from central hole portion 23a to a side hole portion 23b, bolt 61 passes through a space portion 23c. Space portion 23c, which is formed to have a narrowed width, is widened. This absorbs the impact, thereby achieving restraint of impact on electric power storage apparatus 22.

Similarly, impact from the passenger's seat side also causes bolt 61 to move from central hole portion 23a to a side hole portion 23b, whereby the impact can be absorbed. In this way, impact on electric power storage apparatus 22 can be restrained.

In the present embodiment, two space portions are formed in each insertion through hole into which a bolt is inserted. However, the present invention is not limited to this form. Any number of space portions can be formed. For example, in the present embodiment, side hole portions 23b are provided on the opposite sides lateral to central hole portion 23a respectively. However, the present invention is not limited to this form. Two or more side hole portions may be formed in a consecutive manner. With this configuration, the fastening member can pass through a larger number of space portions when impact is imposed on the electric power storage apparatus, and impact can be therefore absorbed more. In addition, when being subjected to impact, the electric power storage apparatus can be moved a longer distance. This allows more effective restraint of impact on the electric power storage apparatus.

In the present embodiment, a bolt is used as the fastening member. However, the present invention is not limited to this form. Any fastening member can be used to fix the electric power storage apparatus to the floor member.

Other configurations, functions, and effects are the same as those in the first embodiment, so explanation therefor is not repeated.

Fifth Embodiment

Figure 12:
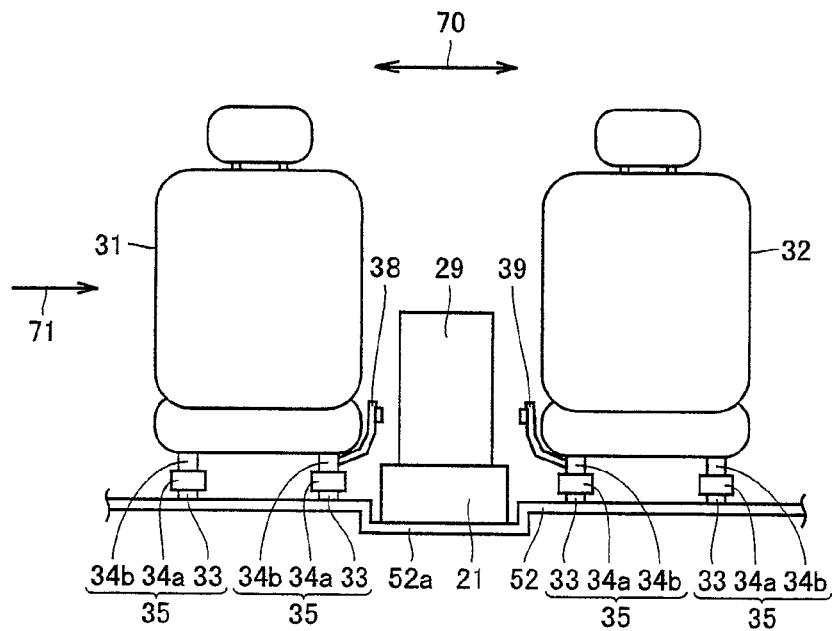
FIG. 12 is a first schematic cross sectional view of a vehicle in a fifth embodiment.
Figure 13:
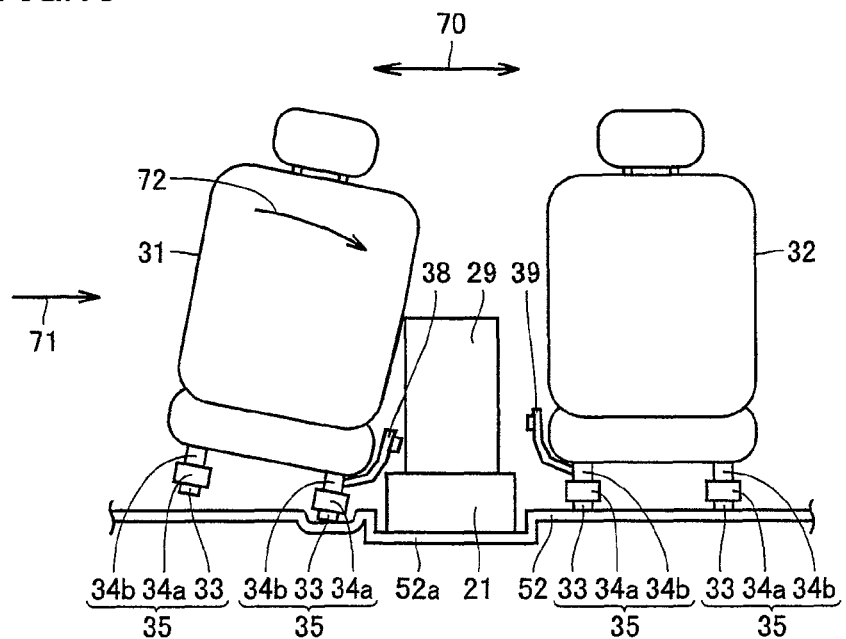
FIG. 13 is a second schematic cross sectional view of the vehicle in the fifth embodiment.
Figure 14:
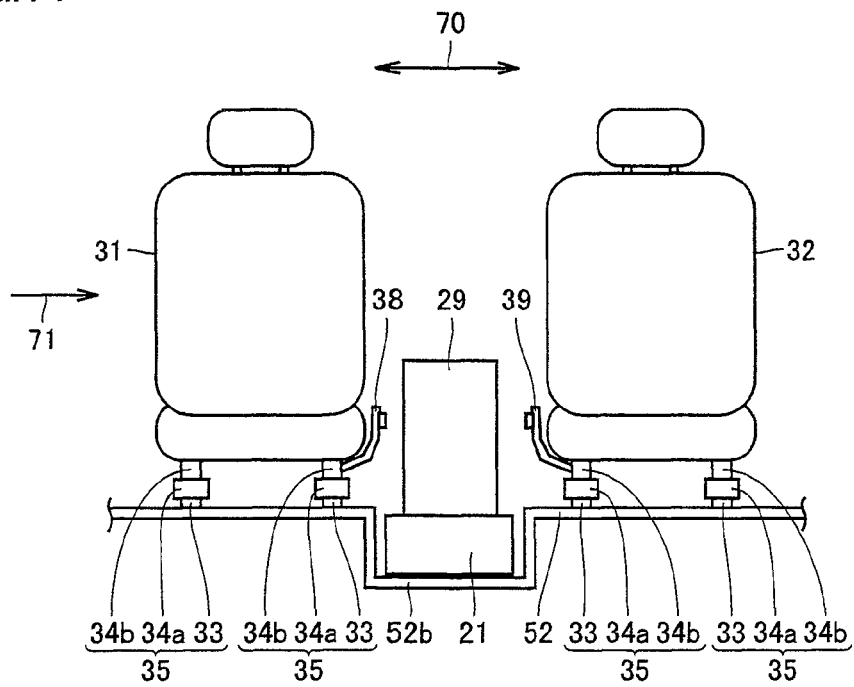
FIG. 14 is a schematic cross sectional view of another vehicle in the fifth embodiment.

Referring to FIG. 12 to FIG. 14, a vehicle in a fifth embodiment will be described.

FIG. 12 is a first schematic cross sectional view of the vehicle in the present embodiment. FIG. 12 is a schematic cross sectional view when taken at a portion in front of the driver's seat and the passenger's seat in the width direction of the vehicular body.

The vehicle in the present embodiment includes a floor panel 52 serving as a floor member. Floor panel 52 has a recess portion 52a. Recess portion 52a is formed between driver's seat 31 and passenger's seat 32. Recess portion 52a has a bottom surface on which an electric power storage apparatus 21 can be installed. Electric power storage apparatus 21 in the present embodiment is positioned in recess portion 52a.

FIG. 13 shows a second schematic cross sectional view of the vehicle in the present embodiment. FIG. 13 is a schematic cross sectional view upon impact lateral to the vehicular body. For example, when impact is imposed from the driver's seat 31 side as indicated by an arrow 71, driver's seat 31 is knocked down as indicated by an arrow 72.

In the present embodiment, electric power storage apparatus 21 is provided within recess portion 52a, so the level of electric power storage apparatus 21 can be low. In this way, a distance from driver's seat 31 to electric power storage apparatus 21 can be longer to prevent driver's seat 31 from hitting against electric power storage apparatus 21, whereby impact on electric power storage apparatus 21 can be restrained. For example, a distance from receiving metal fitting 38 of driver's seat 31 to electric power storage apparatus 21 is longer to achieve restraint of impact on electric power storage apparatus 21. Also, upon impact from the passenger's seat 32 side, electric power storage apparatus 21 can be prevented from being hit by passenger's seat 32.

FIG. 14 shows a schematic cross sectional view of another vehicle in the present embodiment. FIG. 14 is a schematic cross sectional view when taken at a portion in front of the driver's seat and the passenger's seat in the width direction of the vehicular body. This vehicle includes a floor panel 52 serving as a floor member. Floor panel 52 has a recess portion 52b. Recess portion 52b is formed to contain electric power storage apparatus 21 therein.

Recess portion 52b is formed to be deeper than the height of electric power storage apparatus 21. In other words, recess portion 52b has a depth to accommodate electric power storage apparatus 21 in the space defined by recess portion 52b. Recess portion 52b is formed so that the upper surface of electric power storage apparatus 21 does not protrude from surrounding surfaces of recess portion 52a of floor panel 52.

Also in this vehicle in the present embodiment, impact on the electric power storage apparatus can be restrained when lateral impact is imposed. For example, a distance from driver's seat 31 to electric power storage apparatus 21 can be longer for impact imposed from the driver's seat 31 side as indicated by arrow 71 to knock down driver's seat 31. Driver's seat 31 can be therefore prevented from hitting against electric power storage apparatus 21, which achieves effective restraint of impact on electric power storage apparatus 21.

Further, driver's seat 31 hits against passenger's seat 32 on its way to electric power storage apparatus 21, which can prevent driver's seat 31 from hitting against electric power storage apparatus 21. Furthermore, even if driver's seat 31 falls down completely, driver's seat 31 can be prevented from hitting against electric power storage apparatus 21 because the upper surface of electric power storage apparatus 21 does not protrude from recess portion 52b. In addition, when a ballistic fragment is coming along floor panel 52, the ballistic fragment can be prevented from colliding with electric power storage apparatus 21, thus achieving restraint of impact on electric power storage apparatus 21.

Other configurations, functions, and effects are the same as those in the first embodiment, so explanation therefor is not repeated.

The same or equivalent portions in the drawings described above are given the same reference characters. In addition, the embodiments described above may be combined appropriately.

The embodiments disclosed herein are illustrative and non-restrictive in any respect. The scope of the present invention is defined by the scope of claims rather than the above description, and is intended to include any modifications within the scope and meaning equivalent to the terms of the claims.

Industrial Applicability

The present invention relates to a vehicle, in particular, is suitable for a vehicle including an electric power storage apparatus.

The invention claimed is:

1. A vehicle comprising:
a floor member;
a first seat and a second seat fixed to said floor member and arranged side by side in a direction perpendicular to a traveling direction;
an electric power storage apparatus provided between said first seat and said second seat; and
a fall prevention member provided above said electric power storage apparatus, wherein said fall prevention member includes an outer case having a box-like shape, and a strengthening plate provided within said outer case,
wherein said strengthening plate is formed to have a surface extending in said direction perpendicular to the traveling direction, and said strengthening plate has a wave-like cross section when taken along a plane that is along said traveling direction, and
wherein said fall prevention member having a strength to receive one of said first seat and said second seat when said one falls onto said fall prevention member, so as to prevent said one from hitting against said electric power storage apparatus.

2. A vehicle comprising:
a floor member;
a first seat and a second seat fixed to said floor member and arranged side by side in a direction perpendicular to a traveling direction;
an electric power storage apparatus provided between said first seat and said second seat; and
a fastening member for fixing said electric power storage apparatus to said floor member,
said electric power storage apparatus having an insertion through hole into which said fastening member is inserted,
said insertion through hole having a longitudinal direction in said direction perpendicular to the traveling direction,
said insertion through hole having a space portion narrowed in width.

3. The vehicle according to claim 2, wherein said insertion through hole has a plurality of said space portions in said longitudinal direction.

* * * * *